United States Patent
Kamel et al.

(10) Patent No.: US 12,097,784 B2
(45) Date of Patent: Sep. 24, 2024

(54) DISTRIBUTED POWER ARCHITECTURE INCLUDING FUSES

(71) Applicant: GM GLOBAL TECHNOLOGY OPERATIONS LLC, Detroit, MI (US)

(72) Inventors: Mohamed Kamel, Rochester, MI (US); Chandra S. Namuduri, Troy, MI (US); Rashmi Prasad, Troy, MI (US); Jun-mo Kang, Ann Arbor, MI (US); Muhammad Hussain Alvi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 14 days.

(21) Appl. No.: 18/166,612

(22) Filed: Feb. 9, 2023

(65) Prior Publication Data

US 2024/0270118 A1 Aug. 15, 2024

(51) Int. Cl.
*B60L 58/20* (2019.01)
*H02J 7/00* (2006.01)

(52) U.S. Cl.
CPC .......... *B60L 58/20* (2019.02); *H02J 7/0031* (2013.01); *H02J 7/0063* (2013.01); *B60L 2210/10* (2013.01); *B60L 2240/545* (2013.01); *B60L 2240/547* (2013.01); *H02J 2310/48* (2020.01)

(58) Field of Classification Search
CPC .......... B60L 58/20; B60L 2210/10; B60L 2240/545; B60L 2240/547; H02J 7/0031; H02J 7/0063; H02J 2310/48
See application file for complete search history.

(56) References Cited

U.S. PATENT DOCUMENTS

| 6,873,134 | B2 * | 3/2005 | Canter | H02J 7/0016 |
| | | | | 320/118 |
| 10,793,019 | B2 * | 10/2020 | Duan | H02J 7/0016 |
| 2018/0208064 | A1 * | 7/2018 | Wortberg | B60L 3/0092 |
| 2018/0262111 | A1 * | 9/2018 | Taniguchi | H02M 1/14 |
| 2018/0290544 | A1 * | 10/2018 | Long | H02J 1/102 |
| 2023/0001869 | A1 * | 1/2023 | Gronau | H02M 3/003 |
| 2023/0411953 | A1 * | 12/2023 | Chen | H02H 3/087 |

* cited by examiner

*Primary Examiner* — Carlos Amaya
(74) *Attorney, Agent, or Firm* — CANTOR COLBURN LLP

(57) ABSTRACT

Fuse configurations for a distributed power architecture of a vehicle is provided. The distributed power architecture includes a high-voltage battery pack having a plurality of batteries and a plurality of converters, each of the plurality of converters being configured to receive high-voltage power from one of the plurality of batteries and to provide low-voltage power to a low-voltage bus. The distributed power architecture also includes a plurality of fuses disposed on one or more of an input side and an output side of each of the plurality of converters and a vehicle controller with at least one communication link to each of the plurality of power converters. Each of the plurality of fuses are configured to selectively prevent current flow through one of the plurality of converters.

20 Claims, 11 Drawing Sheets

DISTRIBUTED POWER ARCHITECTURE INCLUDING FUSES

INTRODUCTION

The disclosure relates to a distributed power architecture for a vehicle, and more particularly to fuse configurations for a distributed power architecture.

In general, vehicles include many different electrical systems. These electrical systems include, but are not limited to, infotainment systems, lighting systems, power steering systems, power braking systems, driver assistance systems, various sensors, heating and air conditioning systems, and the like. Many of these electrical systems operate on a low voltage (i.e., 12V) bus that traditionally receives power from a low voltage battery.

Recently, electric and hybrid vehicles have been developed which include high voltage (i.e., >400V) battery packs and it is desirable to power the low voltage bus with the high voltage battery pack.

SUMMARY

In one exemplary embodiment, a distributed power architecture of a vehicle is provided. The distributed power architecture includes a high-voltage battery pack having a plurality of batteries and a plurality of converters, each of the plurality of converters being configured to receive high-voltage power from one of the plurality of batteries and to provide low-voltage power to a low-voltage bus. The distributed power architecture also includes a plurality of fuses disposed on one or more of an input side and an output side of each of the plurality of converters and a vehicle controller with at least one communication link to each of the plurality of power converters. Each of the plurality of fuses are configured to selectively prevent current flow through one of the plurality of converters.

In addition to the one or more features described herein the at least one of the plurality of fuses is an electronic fuse.

In addition to the one or more features described herein the electronic fuse is configured to selectively prevent current flow in at least one direction.

In addition to the one or more features described herein the vehicle controller selectively configures the electronic fuse to prevent current flow in at least one direction using at least a single control command.

In addition to the one or more features described herein the vehicle controller selectively configures the electronic fuse to prevent current flow in different directions using plurality of different control commands.

In addition to the one or more features described herein the number of the plurality of fuses is half of a number of the plurality of converters.

In addition to the one or more features described herein the plurality of wires connect the plurality of batteries to the plurality of converters and wherein a number of the plurality of wires is one greater than a number of the plurality of converters.

In addition to the one or more features described herein the at least one of the plurality of fuses is disposed on the input side of the plurality of converters and at least one of the plurality of fuses is disposed on the output side of the plurality of converters.

In addition to the one or more features described herein the vehicle controller configured to selectively activate the at least one of the plurality of fuses disposed on the input side of the plurality of converters at a different time from the at least one of the plurality of fuses disposed on the output side of the plurality of converters.

In addition to the one or more features described herein the low-voltage bus is not connected to a low-voltage battery.

In addition to the one or more features described herein the at least one of the plurality of fuses is a fusible metal strip that is embedded in at least one conductive layer in a printed circuit board of one of the plurality of converters.

In addition to the one or more features described herein the vehicle controller is configured to monitor a temperature of each of the plurality of converters and to selectively activate or deactivate one of the plurality of the electronic fuses connected to one of the plurality of converters based on the sensed temperature of the one of the plurality of converters.

In one exemplary embodiment, a vehicle having a distributed power architecture is provided. The distributed power architecture includes a high-voltage battery pack having a plurality of batteries and a plurality of converters, each of the plurality of converters being configured to receive high-voltage power from one of the plurality of batteries and to provide low-voltage power to a low-voltage bus. The distributed power architecture also includes a plurality of fuses disposed on one or more of an input side and an output side of each of the plurality of converters and a vehicle controller with at least one communication link to each of the plurality of power converters. Each of the plurality of fuses are configured to selectively prevent current flow through one of the plurality of converters.

In addition to the one or more features described herein the at least one of the plurality of fuses is an electronic fuse.

In addition to the one or more features described herein the electronic fuse is configured to selectively prevent current flow in at least one direction.

In addition to the one or more features described herein the vehicle controller selectively configures the electronic fuse to prevent current flow in at least one direction using at least a single control command.

In addition to the one or more features described herein the vehicle controller selectively configures the electronic fuse to prevent current flow in different directions using plurality of different control commands.

In addition to the one or more features described herein the number of the plurality of fuses is half of a number of the plurality of converters.

In addition to the one or more features described herein the plurality of wires connect the plurality of batteries to the plurality of converters and wherein a number of the plurality of wires is one greater than a number of the plurality of converters.

In addition to the one or more features described herein the at least one of the plurality of fuses is disposed on the input side of the plurality of converters and at least one of the plurality of fuses is disposed on the output side of the plurality of converters.

In addition to the one or more features described herein the vehicle controller configured to selectively activate the at least one of the plurality of fuses disposed on the input side of the plurality of converters at a different time from the at least one of the plurality of fuses disposed on the output side of the plurality of converters.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

As discussed above, high-voltage battery packs (i.e., >400V) have recently been added to both electric and hybrid vehicles and it is desirable to power a low-voltage bus of these vehicles with the high-voltage battery pack. In order to provide low-voltage power from a high-voltage battery pack, a voltage converter is needed. Depending on the type of converter used, (i.e., isolated v. non-isolated), additional circuitry may be needed to protect against damage caused by a fault in the distributed power architecture.

Figure 1:
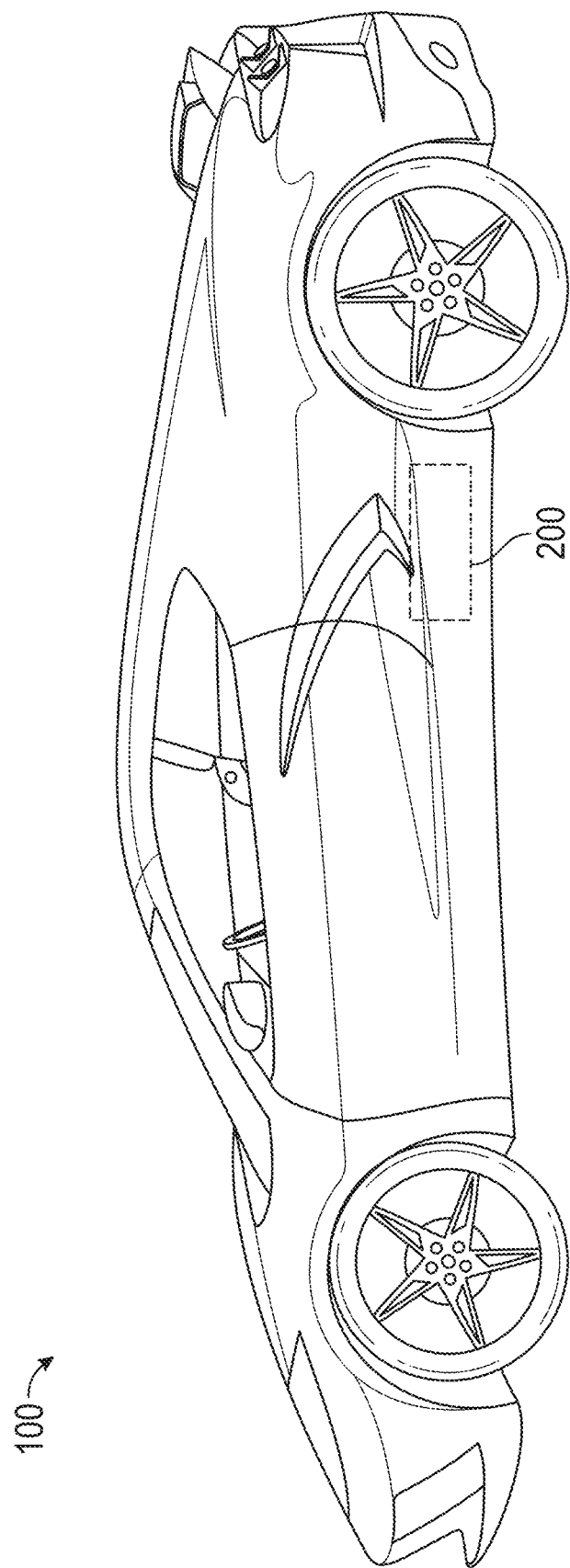
FIG. 1 is a schematic diagram of a vehicle for use in conjunction with one or more embodiments of the present disclosure.

Referring now to FIG. 1, a schematic diagram of a vehicle 100 for use in conjunction with one or more embodiments of the present disclosure is shown. The vehicle 100 includes a distributed power architecture 200. In one embodiment, the vehicle 100 is a hybrid vehicle that utilizes both an internal combustion engine and an electric motor drive system. In another embodiment, the vehicle 100 is one of an electric vehicle propelled only by an electric motor or multiple electric motors. In another embodiment, the vehicle 100 is of conventional type and propelled by an internal combustion engine.

Electric vehicles (EVs) such as battery electric vehicles (BEVs), hybrid vehicles, and/or fuel cell vehicles include one or more electric machines and a high-voltage battery pack. A power control system is used to control the charging and/or discharging of the high-voltage battery system. The power control system includes a distributed power architecture that is configured to provide low-voltage power to one or more electrical systems of the vehicle. As used herein the term low-voltage generally refers to voltages less than fifteen volts and high-voltage generally refers to voltages greater than one hundred volts.

Figure 2A:
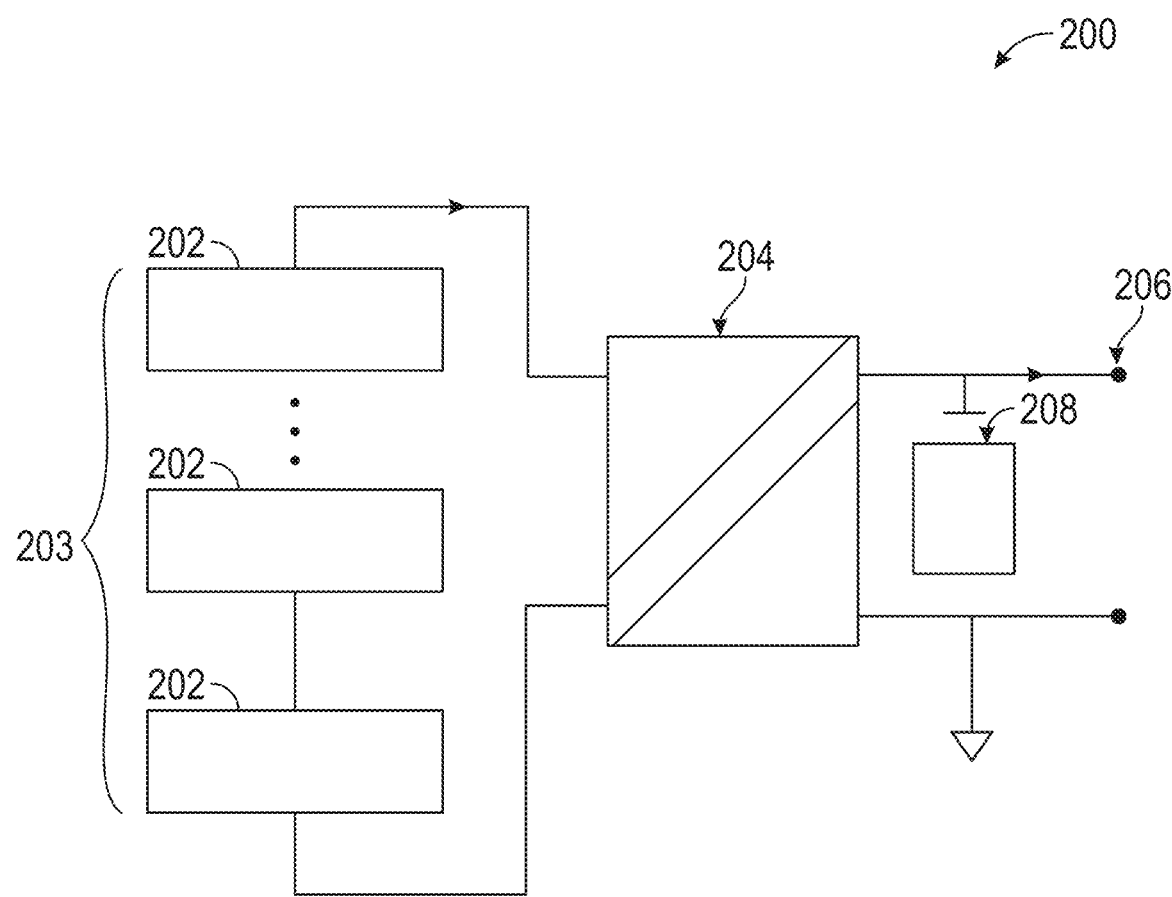
FIG. 2A is a block diagram illustrating a portion of a distributed power architecture for a vehicle in accordance with an exemplary embodiment.

Referring now to FIG. 2A, a block diagram illustrating a portion of a distributed power architecture 200 for a vehicle in accordance with an exemplary embodiment is shown. The distributed power architecture 200 includes a plurality of batteries 202 that are connected in series to form a high-voltage battery pack 203. The high-voltage battery pack is connected to a direct current (DC)/DC converter 204 that is configured to provide a reduced, or low voltage, to a low-voltage bus 206. In exemplary embodiments, the distributed power architecture 200 also includes a low-voltage battery 208 that is also connected to the low-voltage bus 206.

Figure 2C:
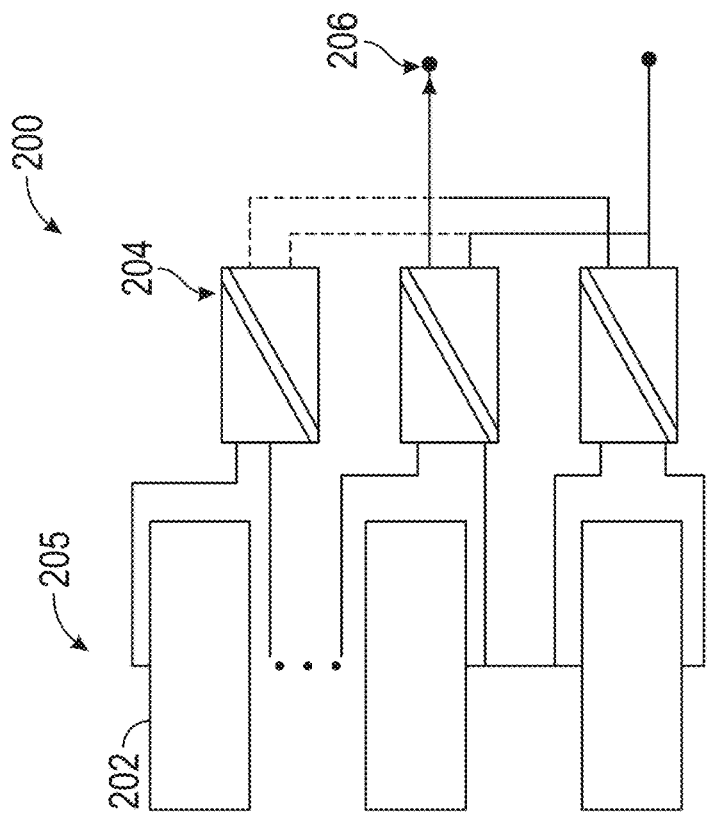
FIG. 2C is a block diagram illustrating a portion of a distributed power architecture for a vehicle in accordance with a further exemplary embodiment.
Figure 2B:
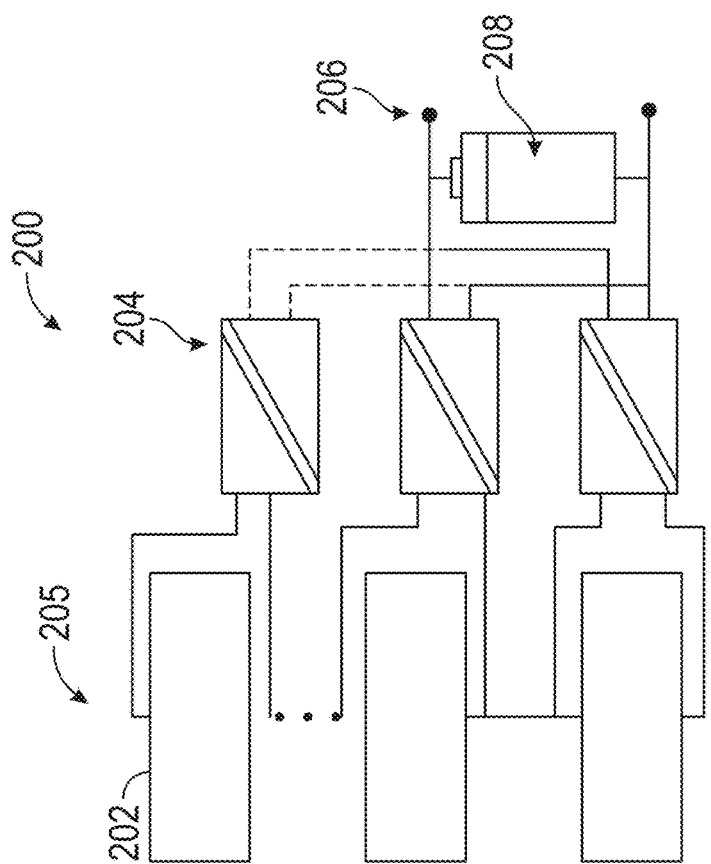
FIG. 2B is a block diagram illustrating a portion of a distributed power architecture for a vehicle in accordance with another exemplary embodiment.

Referring now to FIG. 2B, a block diagram illustrating a portion of a distributed power architecture 200 for a vehicle in accordance with another exemplary embodiment is shown. The distributed power architecture 200 includes a plurality of batteries 202 that are connected in series to form a high-voltage battery pack 203. Each battery 202 is connected to a separate DC/DC converter 204 that is configured to provide a reduced, or low voltage, to a low-voltage bus 206. In exemplary embodiments, the distributed power architecture 200 also includes a low-voltage battery 208 that is also connected to the low-voltage bus 206. In exemplary embodiments, each of the DC/DC converters 204 are connected to one another in parallel.

Referring now to FIG. 2C, a block diagram illustrating a portion of a distributed power architecture 200 for a vehicle in accordance with a further exemplary embodiment is shown. The distributed power architecture 200 includes a plurality of batteries 202 that are connected in series to form a high-voltage battery pack 203. Each battery 202 is connected to a separate DC/DC converter 204 that is configured to provide a reduced, or low voltage, to a low-voltage bus 206. In this embodiment, the distributed power architecture 200 does not include a low-voltage battery. In exemplary embodiments, each of the DC/DC converters 204 are connected to one another in parallel.

In exemplary embodiments, each of the DC/DC converters 204 of the distributed power architecture 200 are isolated converters, (i.e., there is no direct conduction path between the two sides/parts of the circuit). Accordingly, one or more fuses are needed to protect against damage caused by a fault in the distributed power architecture. In exemplary embodiments, various fuse configurations, using different types of fuses, can be implemented to provide fault protection in the distributed power architecture 200.

Figure 3A:
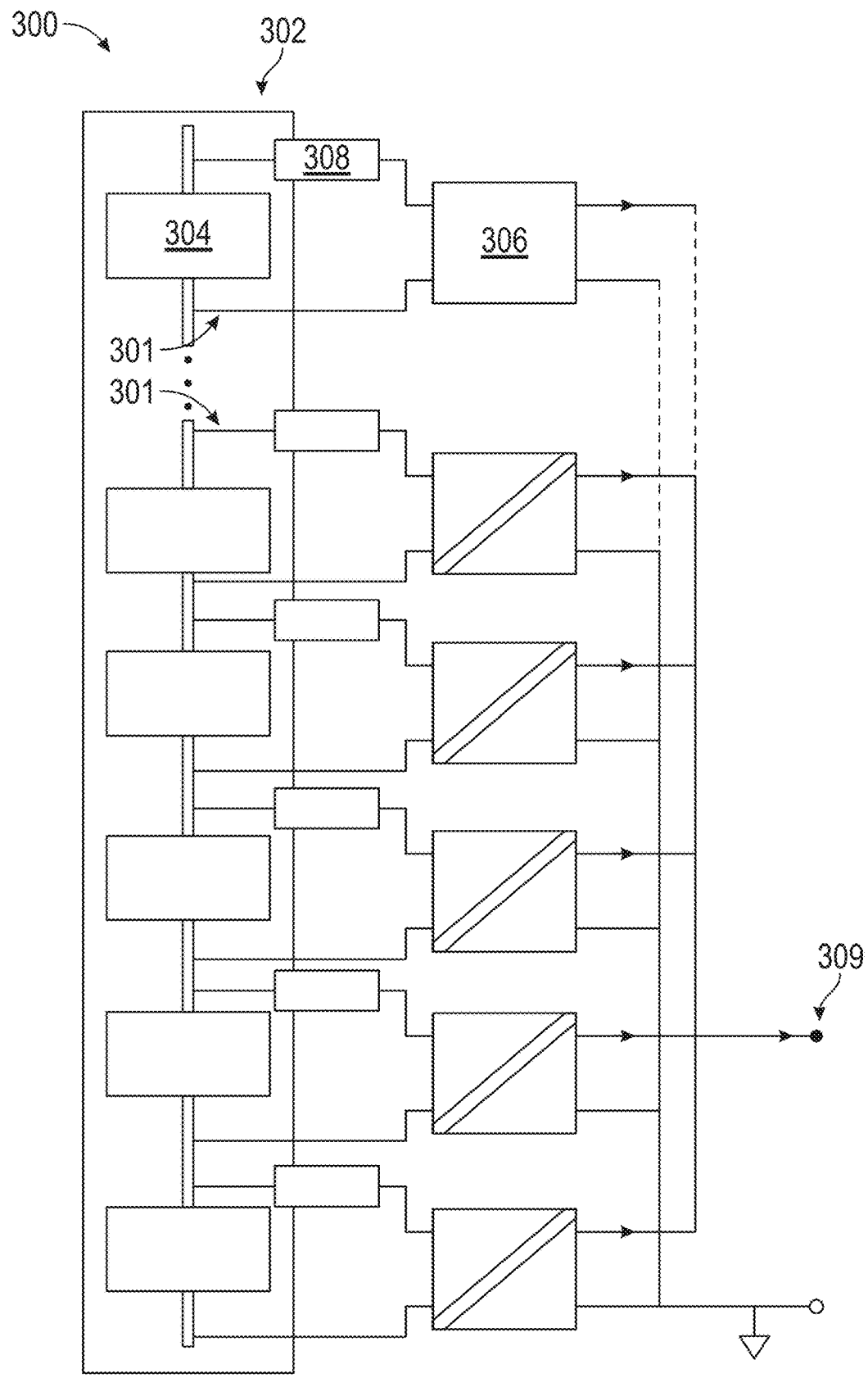
FIGS. 3A, 3B, and 3C are schematic diagrams illustrating distributed power architectures having different fuse configurations in accordance with exemplary embodiments.

Referring now to FIG. 3A a schematic diagram illustrating a distributed power architecture 300 having a first fuse configuration in accordance with exemplary embodiments is shown. As illustrated, the distributed power architecture 300 includes a high-voltage battery pack 302 that includes a plurality of batteries 304 that are connected to each other in series. The distributed power architecture 300 also includes a plurality of converters 306 that are each connected to one of the plurality of batteries 304 by wires 301. The converters 306 are configured to receive high-voltage power from the batteries 304 and to provide low-voltage power to a low-voltage bus 309. The distributed power architecture 300 further includes a fuse 308 disposed between each battery 304 and converter 306. The fuse 308 may be a traditional fuse or an electronic fuse. In this embodiment, the number of batteries 304 is equal to the number of converters 306 and the number of fuses 308. The number of wires 301 is twice the number of batteries 304. In other embodiments, the number of batteries is more than the number of converters.

Figure 3B:
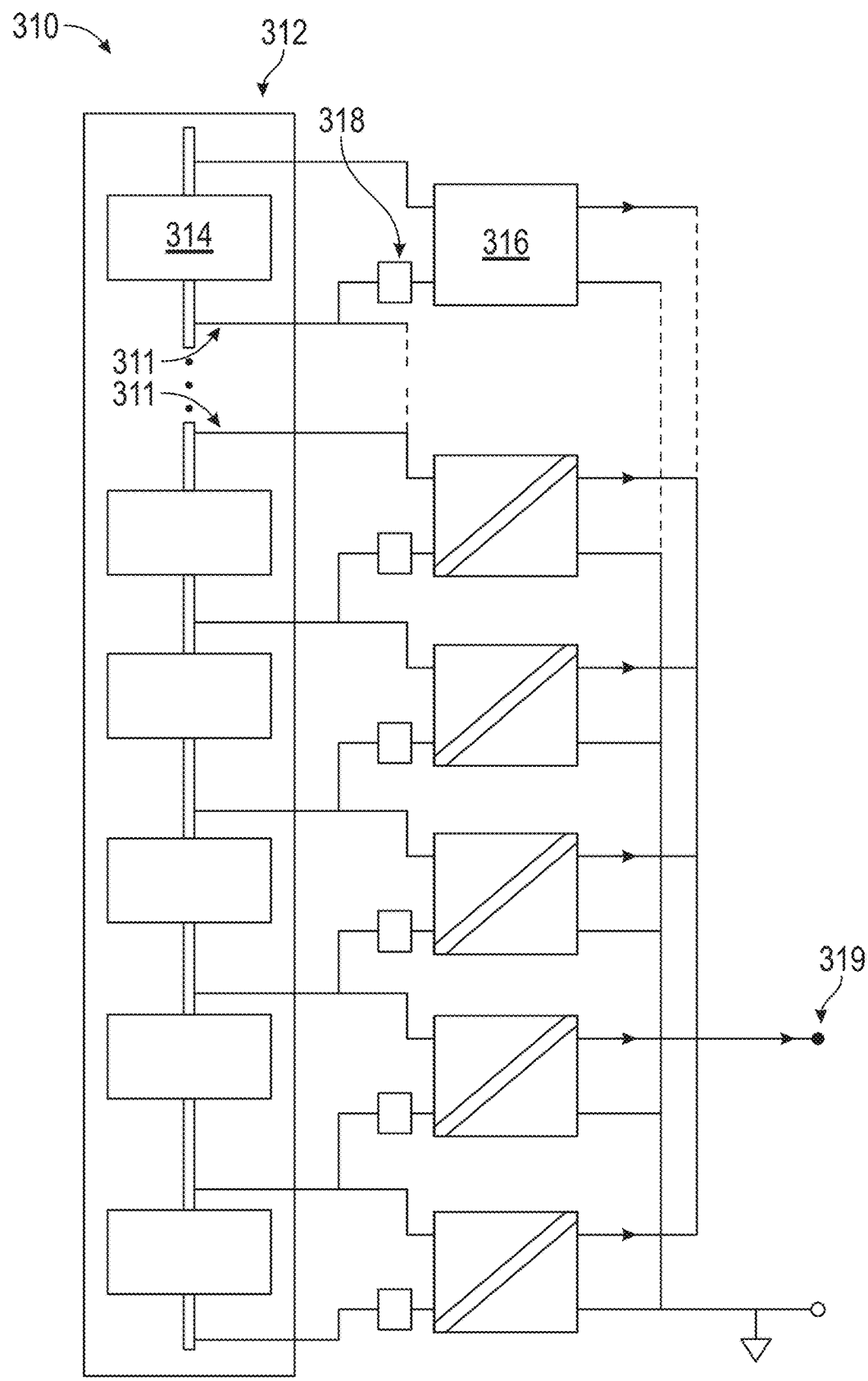

Referring now to FIG. 3B a schematic diagram illustrating a distributed power architecture 310 having a second fuse configuration in accordance with exemplary embodiments is shown. As illustrated, the distributed power architecture 310 includes a high-voltage battery pack 312 that includes a plurality of batteries 314 that are connected to each other in series. The distributed power architecture 310 also includes a plurality of converters 316 that are each connected to one of the plurality of batteries 314 by wires 311. The converters 316 are configured to receive high-voltage power from the batteries 314 and to provide low-voltage power to a low-voltage bus 319. The distributed power architecture 310 further includes a fuse 318 disposed between each battery cell 314 and converter 316. The fuse 318 may be a traditional fuse or an electronic fuse. In this embodiment, the number of batteries 314 is equal to the number of converters 316 and the number of fuses 318. The number of wires 311 is one greater than the number of batteries 314.

Figure 3C:
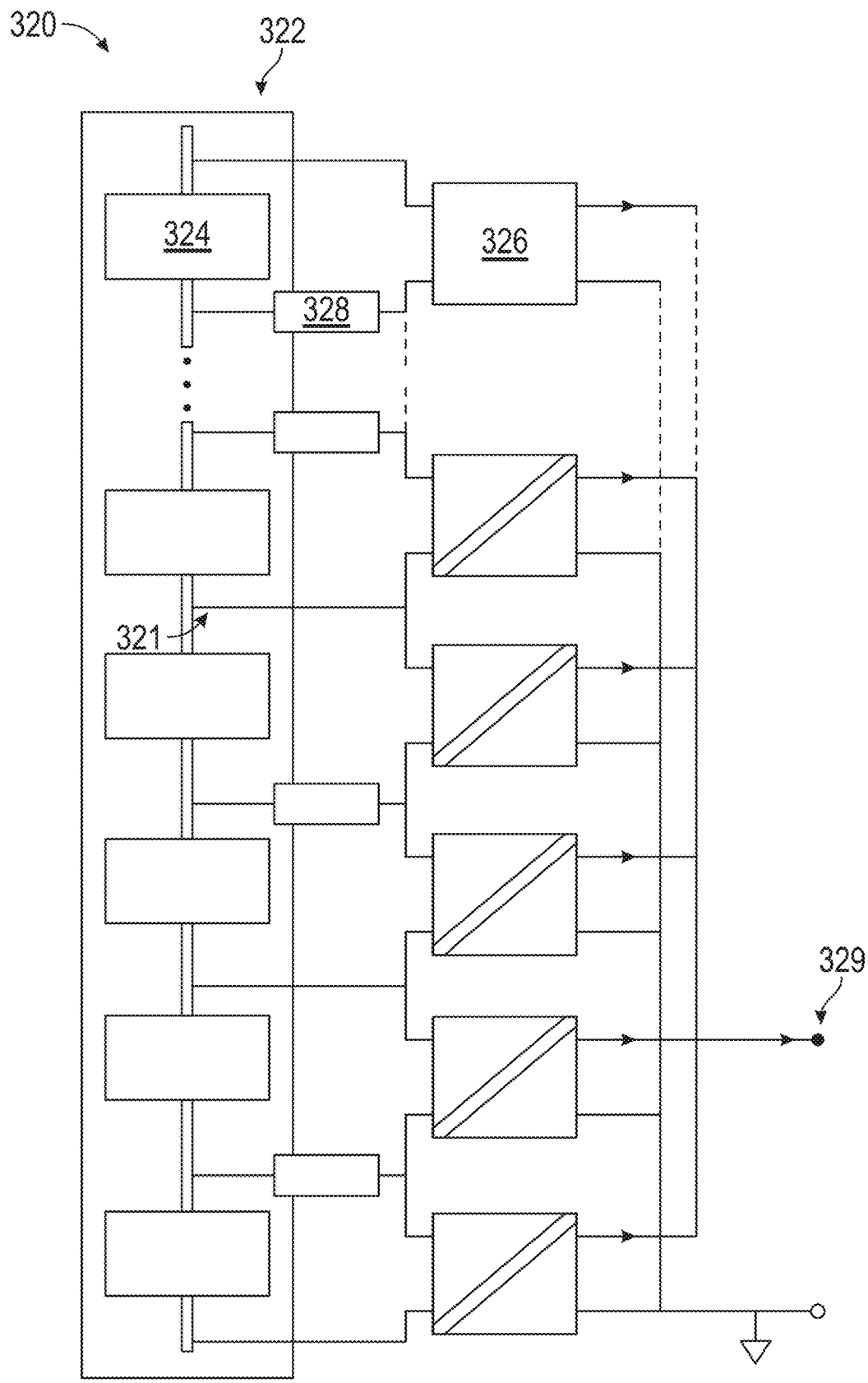

Referring now to FIG. 3C a schematic diagram illustrating a distributed power architecture 320 having a third fuse configuration in accordance with exemplary embodiments is shown. As illustrated, the distributed power architecture 320 includes a high-voltage battery pack 322 that includes a plurality of batteries 324 that are connected to each other in series. The distributed power architecture 320 also includes a plurality of converters 326 that are each connected to one of the plurality of batteries 324 by wires 321. The converters 326 are configured to receive high-voltage power from the batteries 324 and to provide low-voltage power to a low-voltage bus 329. The distributed power architecture 320 further includes fuses 328 that are selectively disposed between batteries 324 and converters 326. The fuses 328 may be a traditional fuse or an electronic fuse. In this embodiment, the number of batteries 324 is equal to the number of converters 326, the number of fuses 328 is half of the number of converters 326, and the number of wires 321 is one greater than the number of batteries 324.

Figure 4A:
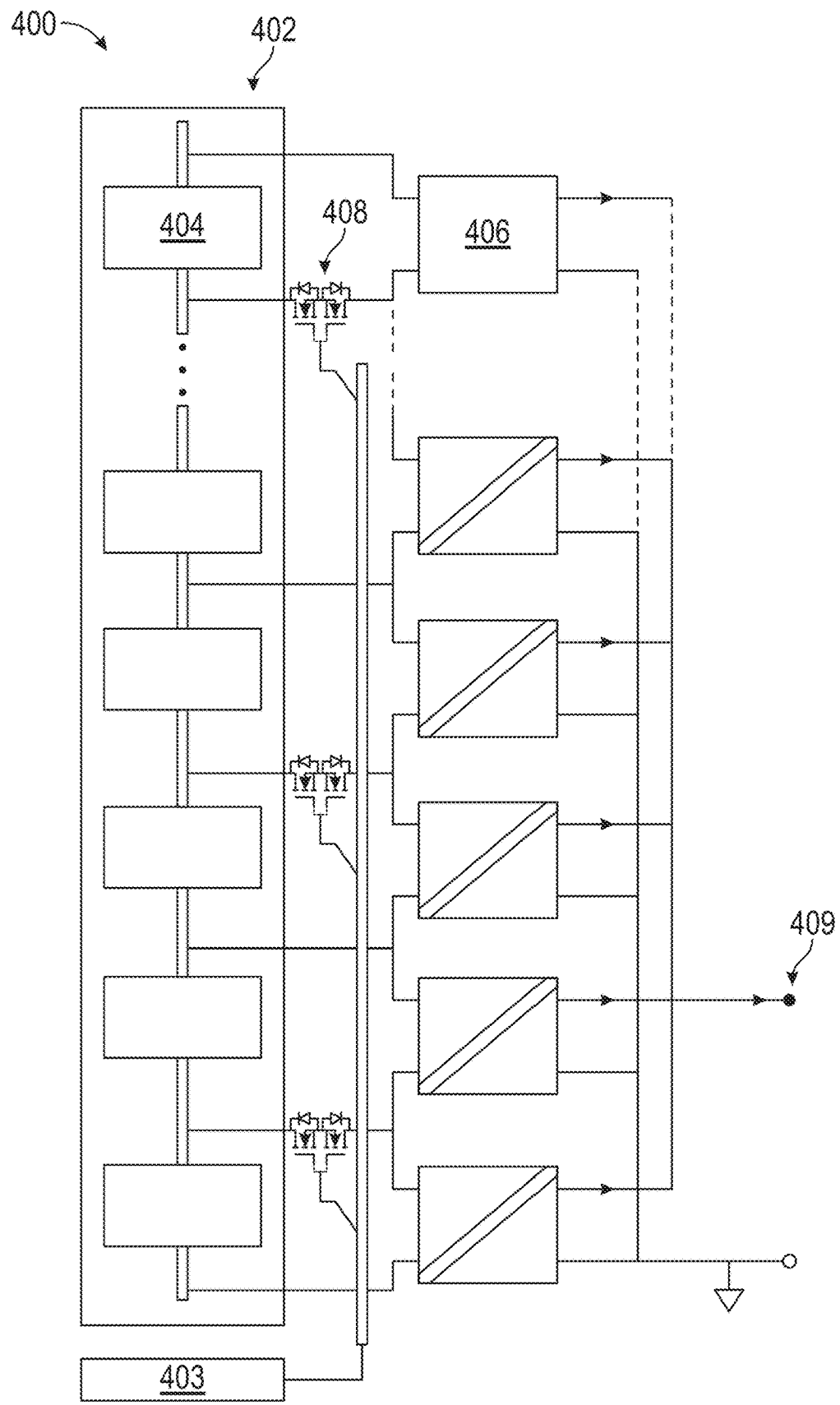
FIGS. 4A and 4B are schematic diagrams illustrating distributed power architectures having different fuse configurations in accordance with exemplary embodiments.

Referring now to FIG. 4A a schematic diagram illustrating a distributed power architecture 400 having a third fuse configuration in accordance with exemplary embodiments is shown. As illustrated, the distributed power architecture 400 includes a high-voltage battery pack 402 that includes a plurality of batteries 404 that are connected to each other in series. The distributed power architecture 400 also includes a plurality of converters 406 that are each connected to one of the plurality of batteries 404. The distributed power architecture 400 further includes electronic fuses 408 that are selectively disposed between batteries 404 and converters 406. The electronic fuses 408 are configured to receive an activation signal 403 that selectively activates or deactivates one or more of the electronic fuses 408. In an exemplary embodiment, the activation signals are received from a vehicle controller. While activated the electronic fuses 408 are configured to prevent current flow in both directions, (i.e., from the battery 404 to the converter 406 and from the converter 406 to the battery 404).

Figure 4B:
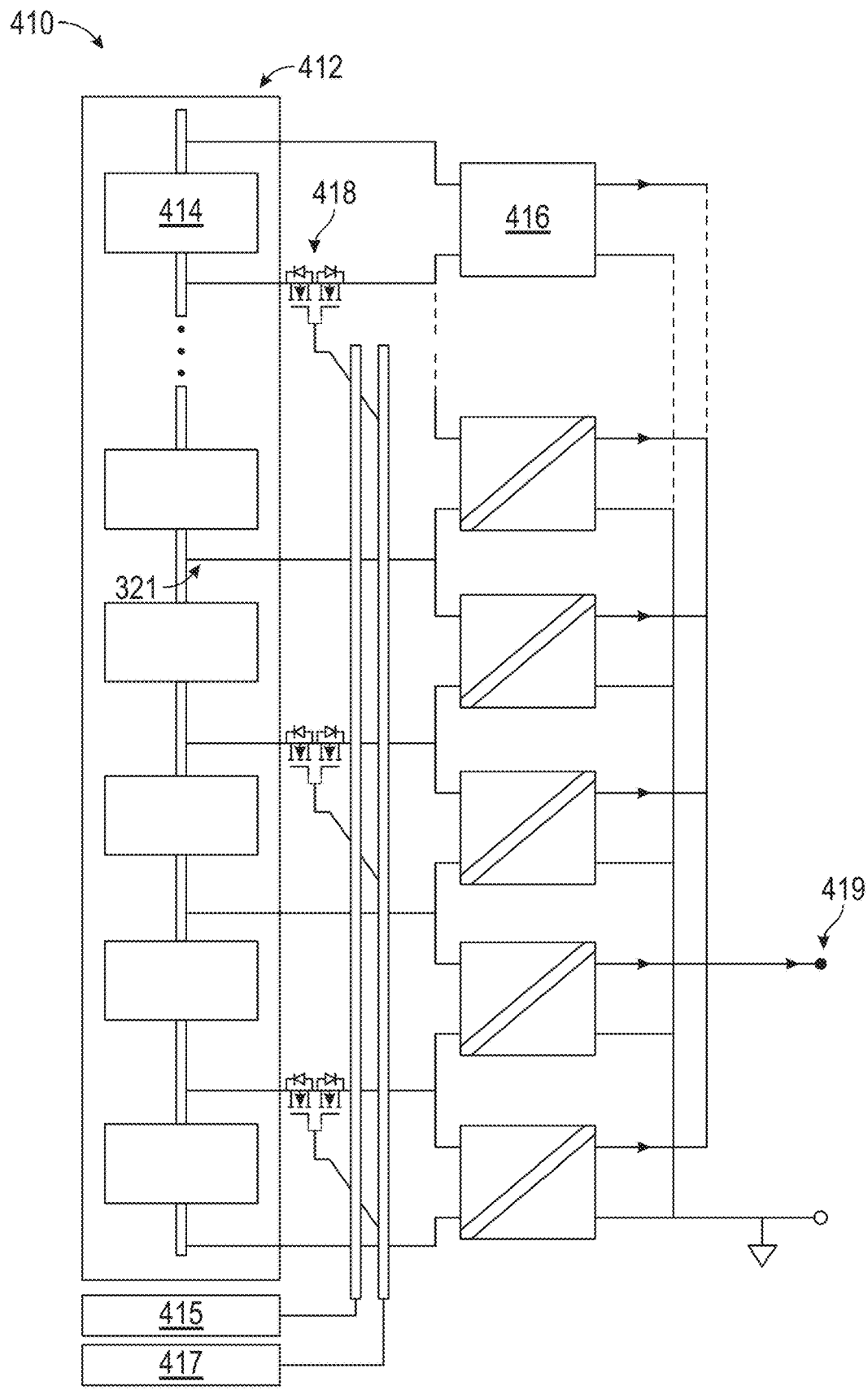

Referring now to FIG. 4B a schematic diagram illustrating a distributed power architecture 410 having the third fuse configuration in accordance with exemplary embodiments is shown. As illustrated, the distributed power architecture 410 includes a high-voltage battery pack 412 that includes a plurality of batteries 414 that are connected to each other in series. The distributed power architecture 410 also includes a plurality of converters 416 that are each connected to one of the plurality of batteries 414. The distributed power architecture 400 further includes electronic fuses 418 that are selectively disposed between batteries 414 and converters 416. The electronic fuses 418 are configured to receive activation signals 415, 417 that selectively activate or deactivate one or more of the electronic fuses 418. In one embodiment, activation signal 415 is a charging enable signal that selectively configures the electronic fuses 418 to permit current to flow in a first direction (i.e., from the battery 404 to the converter 406) and activation signal 417 is a discharging enable signal that selectively configures the electronic fuses 418 to permit current to flow in a second direction (i.e., from the converter 406 to the battery 404), which is opposite of the first direction.

Figure 5:
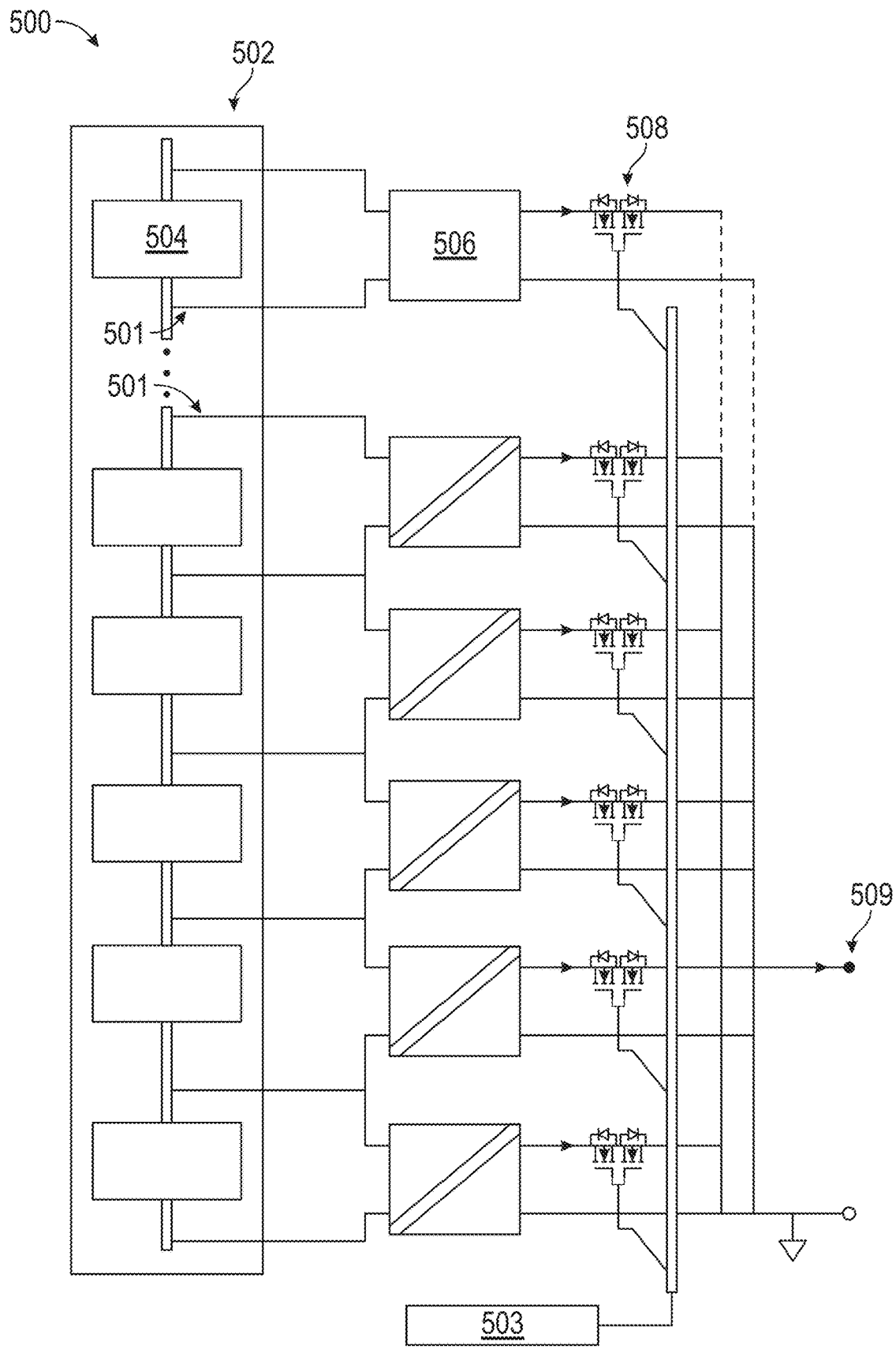
FIG. 5 is a schematic diagram illustrating a distributed power architecture including a fuse configuration in accordance with exemplary embodiments.

Referring now to FIG. 5, a schematic diagram illustrating a distributed power architecture 500 including a fourth fuse configuration in accordance with an exemplary embodiment is shown. As illustrated, the distributed power architecture 500 includes a high-voltage battery pack 502 that includes a plurality of batteries 504 that are connected to each other in series. The distributed power architecture 500 also includes a plurality of converters 506 that are each connected to one of the plurality of batteries 504 by wires 501. The converters 506 are configured to receive high-voltage power from the batteries 504 and to provide low-voltage power to a low-voltage bus 509. The distributed power architecture 500 further includes electronic fuses 508 disposed between each converter 506 and the low-voltage bus 509. The electronic fuses 508 are configured to receive an activation signal 503 that selectively activates or deactivates one or more of the electronic fuses 508. While activated the electronic fuses 508 are configured to prevent current flow in both directions, (i.e., from the low-voltage bus 509 to the converter 506 and from the converter 506 to the low-voltage bus 509).

Figure 6:
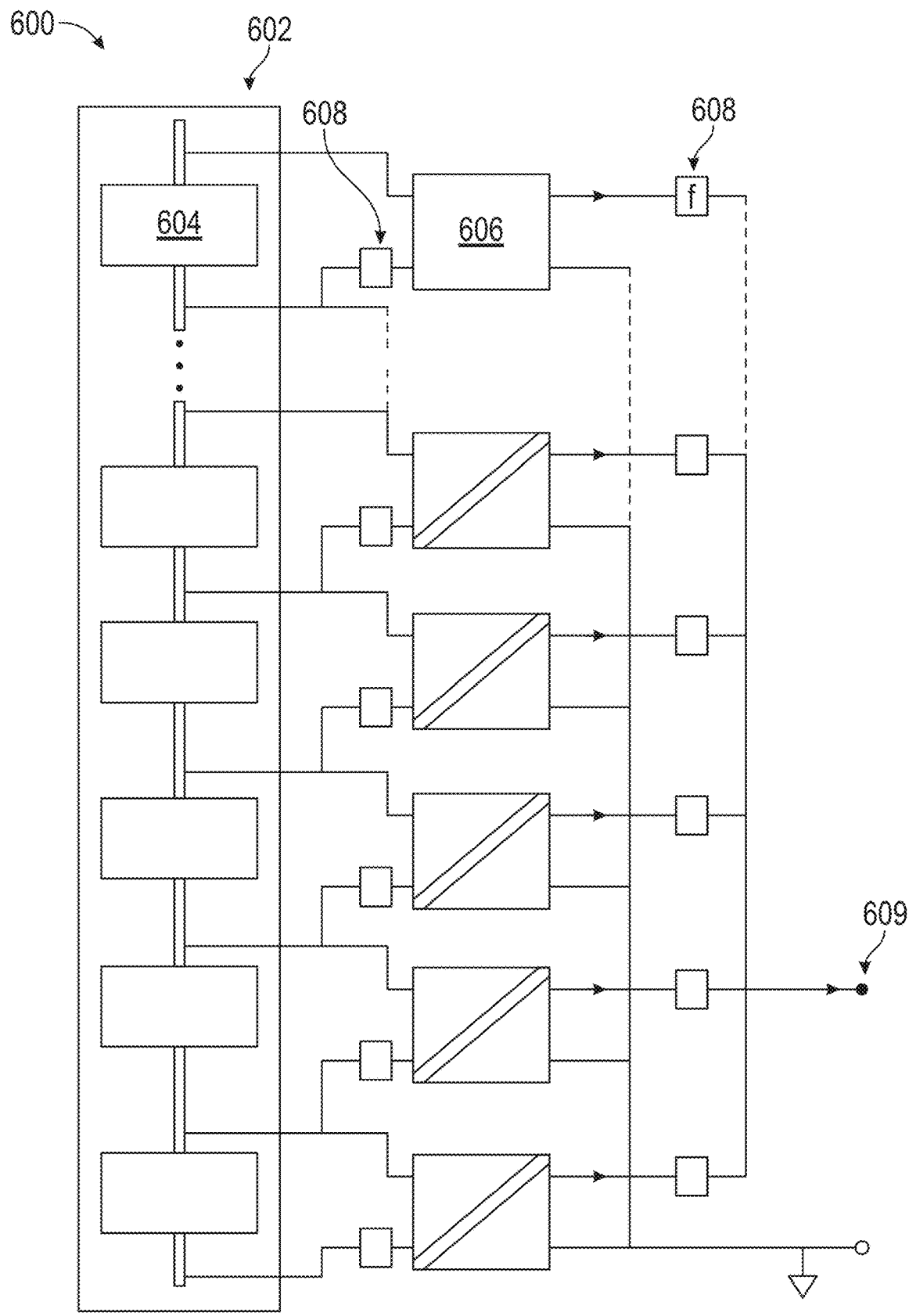
FIG. 6 is a schematic diagram illustrating a distributed power architecture including another fuse configuration in accordance with exemplary embodiments.

Referring now to FIG. 6, a schematic diagram illustrating a distributed power architecture 600 including a fifth fuse configuration in accordance with an exemplary embodiment is shown. As illustrated, the distributed power architecture 600 includes a high-voltage battery pack 602 that includes a plurality of batteries 604 that are connected to each other in series. The distributed power architecture 600 also includes a plurality of converters 606 that are each connected to one of the plurality of batteries 604. The converters 606 are configured to receive high-voltage power from the batteries 604 and to provide low-voltage power to a low-voltage bus 609. The distributed power architecture 600 further includes fuses 608 that are disposed between the batteries 604 and the converters and between each converter 606 and the low-voltage bus 609.

In exemplary embodiments, the fuses 608 may include one or more traditional and/or one or more electronic fuses. In addition, traditional fuses may be resettable or non-resettable fuses. As used herein a traditional fuse is a fuse that includes a strip of fusible metal that melts or moves out of alignment, when a current through the strip of fusible metal exceeds a threshold amperage to prevent current flow. In one embodiment, the fusible metal strip is embedded in one or more of the printed circuit board conductive layers of the DC/DC converter. As used herein an electronic fuse is a fuse that is activated by an activation signal, rather than automatically activated by the current through the fuse exceeding a threshold amperage.

In exemplary embodiments, the activation signals are provided to the electronic fuse by a controller of the vehicle. The controller is configured to monitor the temperature of each converter and to selectively activate or deactivate the electronic fuse connected to a converter based on the sensed temperature of the converter. For example, the controller is configured to activate an electronic fuse associated with a converter, thereby preventing current flow through the converter, based on a determination that the temperature of the converter exceeds a maximum threshold temperature. Likewise, the controller is configured to deactivate an electronic fuse associated with a converter, thereby allowing current flow through the converter, based on a determination that the temperature of the converter is below a minimum threshold temperature. In another embodiment, the controller may selectively activate/deactivate electronic fuses based on a detected temperature imbalance between adjacent converters.

Figure 7A:
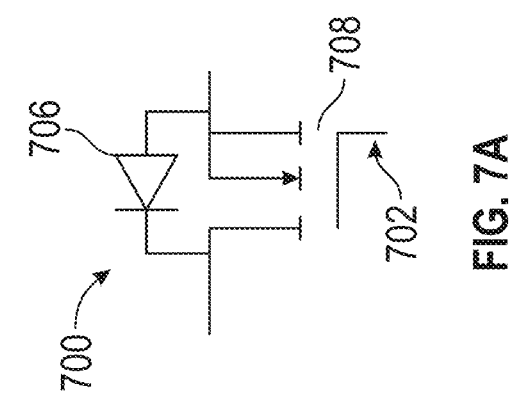
FIGS. 7A, 7B, and 7C are schematic diagrams illustrating different types of electronic fuses in accordance with exemplary embodiments.
Figure 7B:
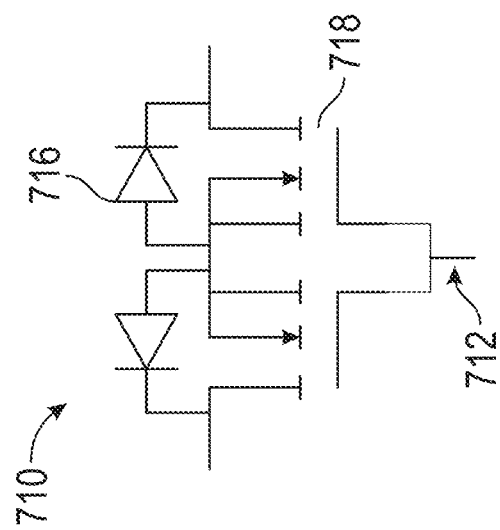
Figure 7C:
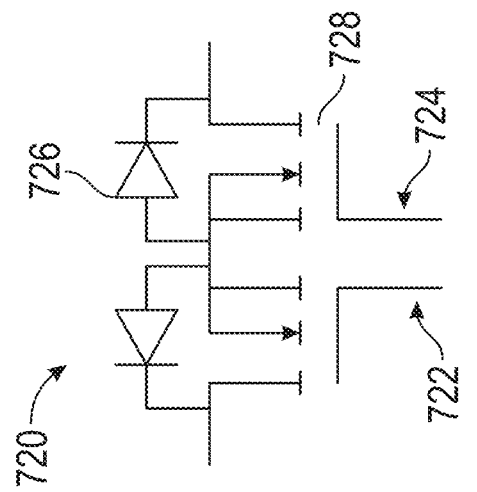

Referring now to FIGS. 7A, 7B, and 7C, schematic diagrams illustrating different types of electronic fuses in accordance with exemplary embodiments are shown. As shown in FIG. 7A, a first type of electronic fuse 700 includes a diode 706 and a transistor 708 that is selectively activated by an activation signal 702. The electronic fuse 700 is configured to selectively permit current flow in a single direction based on the activation signal 702. As shown in FIG. 7B, a second type of electronic fuse 710 includes two diodes 716 and two transistors 718 that are selectively activated by an activation signal 712. The electronic fuse 710 is configured to selectively permit current flow in both directions based on the activation signal 710. As shown in FIG. 7C, a third type of electronic fuse 720 includes two diodes 726 and two transistors 728 that are each independently selectively activated by activation signals 722, 724. The electronic fuse 720 is configured to selectively permit current flow in one or both directions based on the activation signals 722, 724.

In exemplary embodiments, the number, placement, and type of fuses in a distributed power architecture of a vehicle may vary based on multiple factors. In exemplary embodiments, fuses may be disposed on the input side of a converter (i.e., between a converter and a high-voltage source) and/or on the output side of the converter (i.e., between a converter and a low-voltage bus). In one embodiment, one or more of the electronic fuses may be enabled/disabled in a group through an activation signal. In other embodiments, each electronic fuse is individually controlled through the use of separate activation signals.

In embodiments, such as the one shown in FIG. 6, where fuses are disposed both on the input side of the converter and on the output side of the converter, the timing of the activation is controlled by the controller. In one embodiment, the electronic fuses disposed on the input side of the converter are enabled prior to enabling the electronic fuses disposed on the output side of the converter. In another embodiment, the electronic fuses disposed on the output side of the converter are enabled prior to enabling the electronic fuses disposed on the input side of the converter. In embodiments with electronic fuses, the fuses require a power circuitry that enables or disables the electronic fuse operation, which is often called a gate driver circuit. In some embodiments, the gate driver circuit receives power from the side at which the fuse is connected to.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A distributed power architecture of a vehicle, the distributed power architecture comprising:
   a high-voltage battery pack having a plurality of batteries;
   a plurality of converters, each of the plurality of converters being configured to receive high-voltage power from one of the plurality of batteries and to provide low-voltage power to a low-voltage bus;
   a plurality of fuses disposed on one or more of an input side and an output side of each of the plurality of converters; and
   a vehicle controller with at least one communication link to each of the plurality of converters,
   wherein each of the plurality of fuses are configured to selectively prevent current flow through one of the plurality of converters, and
   wherein a number of the plurality of fuses is half of a number of the plurality of converters.

2. The distributed power architecture of claim 1, wherein at least one of the plurality of fuses is an electronic fuse.

3. The distributed power architecture of claim 2, wherein the electronic fuse is powered from one of the plurality of batteries via one of the plurality of converters.

4. The distributed power architecture of claim 2, wherein the electronic fuse is configured to selectively prevent current flow in at least one direction.

5. The distributed power architecture of claim 2, wherein the vehicle controller selectively configures the electronic fuse to prevent current flow in at least one direction using at least a single control command.

6. The distributed power architecture of claim 2, wherein the vehicle controller selectively configures the electronic fuse to prevent current flow in different directions using plurality of different control commands.

7. The distributed power architecture of claim 1, wherein a plurality of wires connect the plurality of batteries to the plurality of converters and wherein a number of the plurality of wires is one greater than a number of the plurality of converters.

8. A distributed power architecture of a vehicle, the distributed power architecture comprising:
a high-voltage battery pack having a plurality of batteries;
a plurality of converters, each of the plurality of converters being configured to receive high-voltage power from one of the plurality of batteries and to provide low-voltage power to a low-voltage bus;
a plurality of fuses disposed on one or more of an input side and an output side of each of the plurality of converters; and
a vehicle controller with at least one communication link to each of the plurality of converters,
wherein at least one of the plurality of fuses is disposed on the input side of the plurality of converters and at least one of the plurality of fuses is disposed on the output side of the plurality of converters, and
wherein each of the plurality of fuses are configured to selectively prevent current flow through one of the plurality of converters;
wherein the vehicle controller is configured to selectively activate the at least one of the plurality of fuses disposed on the input side of the plurality of converters at a different time from the at least one of the plurality of fuses disposed on the output side of the plurality of converters.

9. The distributed power architecture of claim 1, wherein the low-voltage bus is not connected to a low-voltage battery.

10. The distributed power architecture of claim 1, wherein at least one of the plurality of fuses is a fusible metal strip that is embedded in at least one conductive layer in a printed circuit board of one of the plurality of converters.

11. The distributed power architecture of claim 2, wherein the vehicle controller is configured to monitor a temperature of each of the plurality of converters and to selectively activate or deactivate one of the plurality of the electronic fuses connected to one of the plurality of converters based on a sensed temperature of the one of the plurality of converters.

12. A vehicle comprising:
a distributed power architecture comprising:
a high-voltage battery pack having a plurality of batteries;
a plurality of converters, each of the plurality of converters being configured to receive high-voltage power from one of the plurality of batteries and to provide low-voltage power to a low-voltage bus;
a plurality of fuses disposed on one or more of an input side and an output side of each of the plurality of converters; and
a vehicle controller with at least one communication link to each of the plurality of converters,
wherein each of the plurality of fuses are configured to selectively prevent current flow through one of the plurality of converters
wherein at least one of the plurality of fuses is disposed on the input side of the plurality of converters and at least one of the plurality of fuses is disposed on the output side of the plurality of converters, and
wherein a number of the plurality of fuses is half of a number of the plurality of converters.

13. The vehicle of claim 12, wherein at least one of the plurality of fuses is an electronic fuse.

14. The vehicle of claim 13, wherein the electronic fuse is configured to selectively prevent current flow in at least one direction.

15. The vehicle of claim 13, wherein the vehicle controller selectively configures the electronic fuse to prevent current flow in at least one direction using at least a single control command.

16. The vehicle of claim 13, wherein the vehicle controller selectively configures the electronic fuse to prevent current flow in different directions using plurality of different control commands.

17. The vehicle of claim 12, wherein a plurality of wires connect the plurality of batteries to the plurality of converters and wherein a number of the plurality of wires is one greater than a number of the plurality of converters.

18. The distributed power architecture of claim 8, wherein a number of the plurality of fuses is half of a number of the plurality of converters.

19. The distributed power architecture of claim 8, wherein at least one of the plurality of fuses is an electronic fuse.

20. The distributed power architecture of claim 8, wherein the low-voltage bus is not connected to a low-voltage battery.

* * * * *